Figure 4:
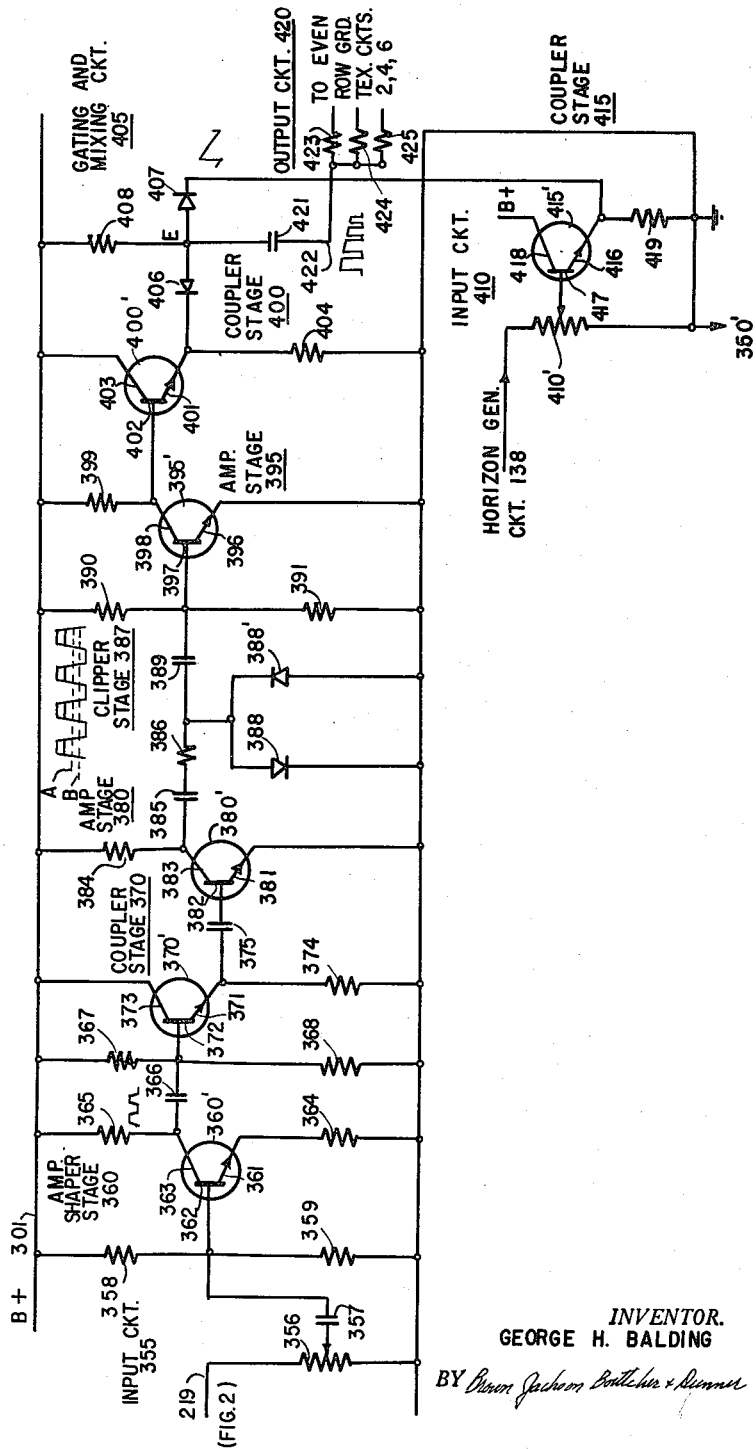

Jan. 7, 1964
G. H. BALDING
3,117,300
ELECTRONIC VISUAL CUE GENERATOR
Filed March 21, 1960
3 Sheets-Sheet 1
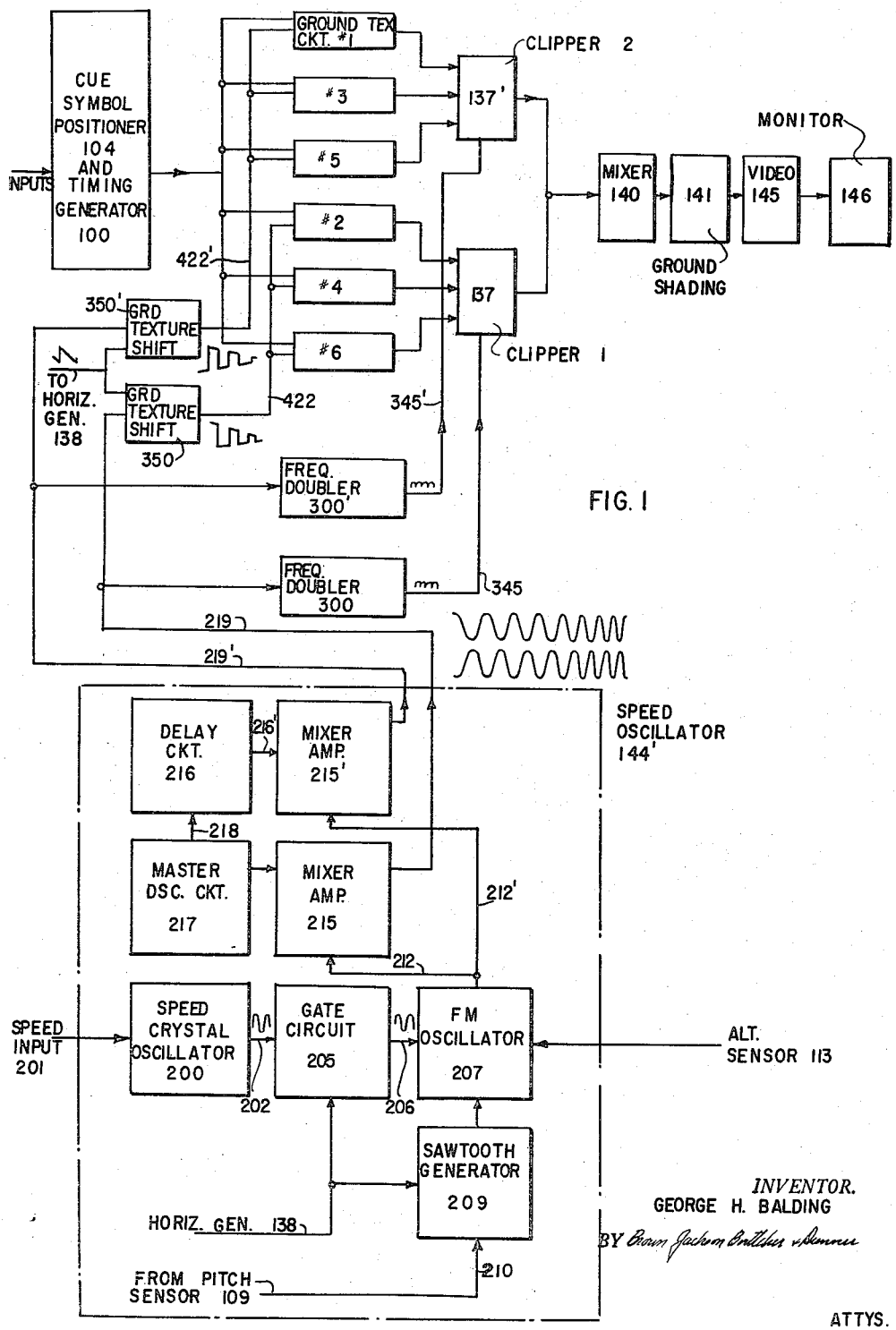
FIG. I
INVENTOR.
GEORGE H. BALDING
BY *Brown Jackson Boettcher & Dienner*
ATTYS.

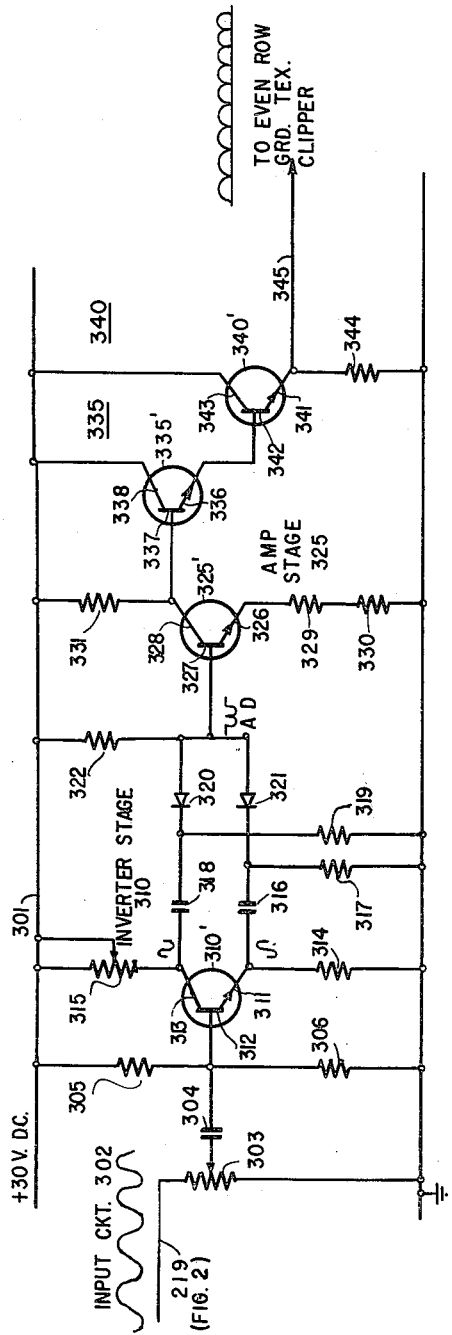
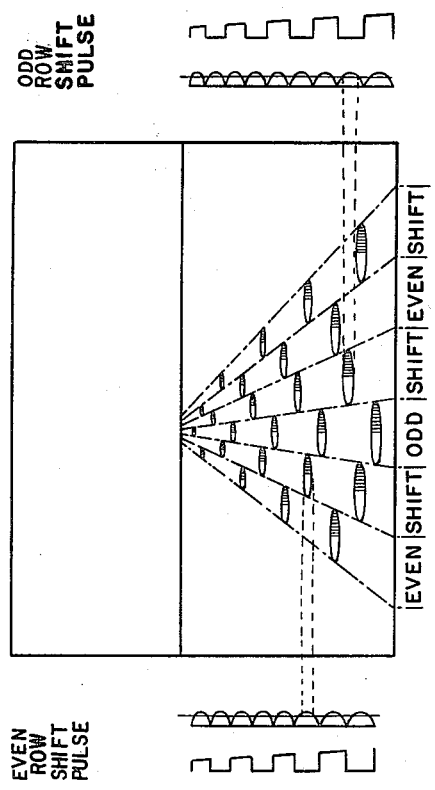

Jan. 7, 1964  G. H. BALDING  3,117,300
ELECTRONIC VISUAL CUE GENERATOR
Filed March 21, 1960  3 Sheets-Sheet 3

*INVENTOR.*
GEORGE H. BALDING
ATTYS.

United States Patent Office 3,117,300
Patented Jan. 7, 1964

3,117,300
ELECTRONIC VISUAL CUE GENERATOR
George H. Balding, Niles, Calif., assignor to Kaiser Industries Corporation, Oakland, Calif., a corporation of Nevada
Filed Mar. 21, 1960, Ser. No. 16,597
9 Claims. (Cl. 340—27)

The present invention relates to a visual cue generator providing an integrated display of information relating to the flight condition of an aircraft, and particularly to an improved all-electronic system for generating such display.

A new and novel device for electronically generating complex electronic signals which create a contact analog display, and which is particularly adapted to provide information relating to the speed, altitude, azimuth, pitch and roll attitude of the aircraft in an integrated display has been set forth in the copending application which was filed on April 11, 1958 by George H. Balding and which received Serial No. 728,019, and the copending application which was filed on March 21, 1960 by George H. Balding and which received Serial No. 16,438 and the present application is considered to be a continuation-in-part of the aforeidentified applications.

In the display presentations of such arrangements, the resultant display includes a sky pattern, a horizon and a ground texture, the sky portion being of a comparatively light intensity which is separated from the ground portion by a dark horizon line, and the ground portion which extends from the dark horizon being of a successively lighter intensity towards the bottom marginal edge of the display. A series of rows of elliptical holes are superposed on the ground portion of the display to provide a ground texture effect, and motion of the aircraft relative to the ground is represented by the movement of the holes or symbols in each row from the horizon across the ground portion in the direction of the lower marginal edge of the display, the symbols increasing in size during such movement towards the bottom edge of the display.

The altitude of the aircraft is represented by the relative size and spacing of the symbols, the symbols being closer together and larger as the aircraft is closer to the ground and being farther apart and smaller as the aircraft is at a higher altitude. Changes of heading of the aircraft is represented by shifting of the rows of symbols laterally across the display in a direction consistent with the direction of change of heading of the aircraft, and banking of the aircraft about its roll axis is represented by tilting of the horizon line and the symbols from the horizontal by an angle consistent with the degree of roll of the aircraft. Changes in pitch of the aircraft are represented by displacement of the horizon line towards the top or bottom of the display as the aircraft is moved from level flight into diving or climbing attitudes. Other display criteria including indications of displacement of the craft from a programmed flight path, terrain and weather conditions, speed symbols, optimum speed cues and others are included in such arrangements.

In the embodiments set forth in the application having Serial No. 728,019, the symbols of the different rows in the ground pattern were disposed in lateral alignment with each other, and the lateral alignment of the holes was maintained in the movement thereof down the screen from the horizon in the direction of the lower display screen to represent movement of the aircraft relative to the ground. It appeared, as a result of various tests and experiments, that in certain uses the movement of the symbols or elements in a fixed pattern across the screen for extended periods of time might result in visual fatigue, and a novel arrangement was provided in the application having Serial No. 16,438 for the purpose of effecting a ground pattern which has a random texture to permit extended viewing without resulting in eye fatigue. The new arrangement also included novel means for including motion perspective in the display whereby the distance between successive elements or symbols in each row diminishes at locations which are closer to the horizon, and in which the speed of the elements increases in the progression thereof from the horizon in the direction of the lower marginal edge of the display.

The arrangement disclosed in such application was successful in accomplishing the desired displacement of the symbols relative to each other, and the resultant display included both motion perspective and random texture effects which accomplished the desired object. In such arrangement, however, the random texture circuits were achieved by using trains of frequency-modulated, sine-wave pulses to modulate or chop each of the vertical rows into a series of textured elements having a variable spacing therebetween, and using countdown circuits to provide tracking signals for selecting given symbols in the vertical rows and performing a different adjustment therein, including altering of the size of the selected element, adjusting of the elements laterally of the associated row, and in certain arrangements blanking of the signal to eliminate the element from the row. It is apparent that such arrangement required a number of complex operating circuits which resulted in added cost in manufacturing, and to some extent, a unit of increased size and weight.

It is an object of the present invention therefore to provide a new and novel circuit arrangement for use with the arrangement of the copending applications which generate signals for providing a random texture in the ground portion of the display, and particularly to provide a circuit arrangement which requires a minimum amount of less complex equipment for generating such signals while yet providing a random texture which is more representative of true world conditions.

The foregoing objects and features of the invention and others which are believed to be new and novel in the art are set forth in the following specification and drawings in which:

FIGURE 1 is a block schematic diagram of the novel random texture generating circuits of the present invention as incorporated in the electronic visual cue generator of the above identified disclosures;

FIGURE 2 is an illustration of a portion of a display, which is provided by the generated signals of the circuit of FIGURE 1, including the signal waveforms which are utilized to effect the random positioning of the symbols on the display; and FIGURES 3 and 4 are detailed circuit diagrams of the novel frequency doubler circuit and the ground texture shift circuits for effecting a random appearance in the novel manner of the invention.

General Description

The contact analog for electronically generating symbols representing of aircraft information in an integrated display, as shown in FIGURE 1, for viewing on a display or monitor unit, such as a cathode ray tube, basically comprises a set of generator circuits which are controlled by information signals derived by sensor units on the aircraft, and which in one basic unit, includes means for providing signals representative of aircraft speed, altitude, pitch, roll and azimuth to the generator circuits.

In that the details of the electronic circuitry for generating the rows of ground texture symbols, and the manner of effecting adjustment of the size, position, rate of movement and relative displacement on the display is set forth in the two copending applications above identified, such circuitry has been shown in abbreviated form herein, and are identified by numbers which correspond to the identification numerals of the preceding applications. Such numbers are readily recognized in that the circuits which have not been disclosed heretofore are identified by numerals in the 300 series and higher.

With brief reference to FIGURE 1, it will be apparent that a timing generator 100 and cue symbol positioner 104 are operative to control a plurality of ground texture device circuits 1–6, each of which comprises a pulse circuit 101 and triangle generator circuit 105 such as shown in my application Serial No. 728,019, to generate triangular shaped output signals which are synchronized with the raster trace of the monitor device, each ground texture device circuit 1–6 providing a triangle shaped pulse during each horizontal line trace in the raster, the different pulse outputs being spaced in each horizontal line relative to each other. A sawtooth waveform which occurs at the rate of the vertical trace is mixed with the signal pulses of the triangle generator, whereby the width of the pulses increases in the lines which are successively closer to the lower marginal edge of the display, and each ground texture circuit 1–6 therefore generates signals which will trace a triangular shaped path on the display screen. Although the pulses are generated by ground texture circuits 1–6 during each horizontal line trace, the lines in which the pulses are displayed on the viewing area of the monitor device is determined by the biasing signal which is in turn controlled by the horizon generator circuit 138. Thus, as shown in FIGURE 2, when the aircraft is in level flight the horizon line (and first row trace in which the pulse output of the ground texture generators 1–6 is displayed) occurs at the approximate middle of the display.

The length and time of occurrence of the pulses generated by the ground texture circuits 1–6 in each horizontal line trace, as shown in more detail hereinafter, determines the width and position of each path on the display, the cue symbol positioner 104 which is controlled by the signal output of the azimuth and altitude sensors 111 and 113, respectively, being operative to in turn modify the signal output of the ground texture circuits 1–6 to effect such adjustment in the path sizes and positions. Thus, as described in the copending applications the altitude sensor 113 (not shown) is operative to couple signals to the cue symbol positioner 104 which effect narrowing of the path as the altitude of the aircraft increases, and widening of the path as the altitude of the aircraft decreases. In a similar manner, the azimuth sensor 111 (not shown) controls the cue symbol positioner 104 to adjust the paths laterally in a direction consistent with the direction and degree of the turn of the aircraft, and the pitch sensor controls the cue symbol positioner 104 to effect movement of the paths closer together and farther apart with changes in pitch, and simultaneously to adjust the angular relation of the outer paths relative to the center path to provide a perspective type display.

As shown in FIGURE 1, the ground texture circuits 1–6 are divided into two groups or channels, the first group comprising ground texture circuits 2, 4, 6 (channel 1) and the second group comprising ground texture circuits 1, 3 and 5, (channel 2). The signal output of the ground texture circuits 2, 4, 6 in channel 1 are coupled to clipper 137, and the signal output of the ground texture circuits in channel 2 are coupled to clipper circuit 137', the output of the clipper circuit 137 and 137' being coupled over a mixer circuit 140, a ground shading circuit 141 and video amplifier 145 to the electron gun of the monitor display unit 146.

As noted above, the triangular waveform output of the ground texture circuits 1–6 are mixed with a vertical sawtooth which occurs at the rate of the vertical trace to provide triangular shaped signals of an increasing width as the vertical trace progresses. As such signals are coupled to the clipper circuits 137 and 137', the portions of the combination waveform which occurs below a certain level are clipped, and only the peaks of the triangular waves which are of a larger value are extended over the clipper circuits, whereby smaller portions of each triangle are passed to the monitor display means 146 during the trace of the upper portion of the display, and larger portions of the triangle are passed during the trace of the lower portion of the display when the vertical sawtooth signal carries the triangle pulses farther above the cutoff point of the clipper circuits 137, 137'. The amplifier circuit 141 limits the amplitude of the triangles to a common level, and couples the same to the electron gun of the monitor 146 for display thereon.

Failing further modulation, the output of the circuits would result in a display consisting of six triangular paths, the apexes of which are located at spaced intervals along the horizon line and the bases of which are located at the lower marginal edge of the display (see the broken lines in FIGURE 2). However, as in the arrangement set forth in the copending application, Serial No. 16,438 which was filed on March 21, 1960, a speed oscillator circuit 144' provides trains of successive pulses over conductors 219, 219' to frequency doubler circuits 300, 300' and clipper circuits 137, 137' for the purpose of modulating the output of the clipper circuits 137 and 137' in a manner to break the paths into rows of elliptical symbols.

More specifically, as shown adjacent the output circuits of speed oscillator circuit 144' in FIGURE 1, the oscillator circuit 144 generates a first set or train of frequency-modulated, sine-wave signals, and couples the same over output conductor 219 to a frequency doubler circuit 300, which generates a train of pulses of increased frequency for coupling over conductor 345 to clipper 137 for channel 1 for the purpose of breaking the paths 2, 4, 6 into separate symbols or elements. In like manner, the oscillator circuit 144' generates a second train of frequency-modulated, sine wave signals, which is displaced 180 degrees relative to the first train, and couples the same over conductor 219' to frequency doubler 300' which increases the frequency of the pulses and couples the same over conductor 345' to the clipper 137' for channel 2 to effect the breaking up of the paths 1, 3, 5 into separate symbols. In that the two wave-form trains are 180 degrees out of phase with each other, and the first set is coupled to clipper 137 to effect the breaking up of the triangular paths 2, 4, and 6, and the second wave train is coupled to clipper 137' to effect the breaking up of the paths 1, 3, 5, it will be apparent that the symbols which are located in the odd and even rows on the display will be vertically displaced relative to each other.

As in the copending application the frequency modulated trains are synchronized to the horizon line trace, and the raster is traced in a reverse manner. Accordingly the since wave pulses of the FM train which occur at the horizon line are of a maximum time duration (lower frequency) and as the trace continues toward the top of the display the frequency of the sine wave pulses will be progressively larger. Thus as the next raster trace is initiated at the bottom of the display the FM train pulses are of an increased frequency and as the trace progresses upwardly in the display the frequency of the pulses increases until such time as the horizon line is reached. At such time maximum pulse frequency occurs in the train just below the horizon line. As the horizon line is traced a new train of pulses is generated.

Accordingly the spacing between adjacent elements in a given row as viewed on the display will be increased in the direction which extends from the horizon to the bottom marginal edge of the display (see FIGURE 2). By providing motion of the trains of impulses relative to the speed of the vertical trace, the symbols will be moved to correspondingly different positions during the successive raster traces, and the illusion of motion of the symbols from the horizon in the direction of the lower marginal edge of the display will be effected.

The novel arrangement also includes random texture circuits 350, 350' which are coupled to the output circuits 219, 219' of the speed oscillator circuit 144', and which are operative to provide waveform shapes as shown in FIGURE 1 adjacent the output side of the ground texture shift circuits 350, 350' for coupling over conductors 422 and 422' to the ground texture circuits 2, 4, 6 in channel 1 and 1, 3, 5 in channel 2 respectively.

The output waveforms of the ground texture shift circuit 350, for example, basically comprises modified square-wave pulses having a variable frequency rate which is consistent with the frequencies of the sine wave pulses of the FM train which is coupled to the input side thereof, and which are modified in shape by the mixture thereof with a negative-going sawtooth wave to effect a modified square wave pulse of changing amplitude progressively over the length of the train.

As will be shown hereinafter in more detail, the variable nature of the impulses output from the ground texture shift circuits are related in frequency to the sine wave pulses, whereby alternate elements are displaced laterally or horizontally to achieve a quasi-random appearance on a display. Further, since the size of the elements or symbols on the display device increase as the element moves down the display, the amplitude of the random texture control pulses increases to effect an increase in the degree or amount of lateral displacement of the symbols. It will be apparent that by introducing the output of the ground texture shift circuits 350, 350' into the input sides of the ground texture circuits 1, 3, 5 and 2, 4, 6, respectively, the size of the texture elements may be reduced (or eliminated altogether) so that the size as well as position of the texture elements may be adjusted virtually in a quasi-random fashion.

*Specific Description*

In that the matter of generating the signals which result in the display of rows of symbols on the display device has been set forth in detail in the copending application, the previously disclosed portions of the circuitry will be described only briefly hereat. With reference to FIGURE 1, the ground texture circuits 1–6 are operative in the manner of the previous disclosures to effect the generation of six triangular paths which form the envelope for the six rows of symbols which are shown in dotted lines in FIGURE 2. A first frequency modulated train of sine wave signals generated by speed oscillator circuit 144' is mixed with the output of the ground texture circuits 2, 4, 6, and a second frequency modulated train of sine wave pulses out of phase with the first train is mixed with the output of the ground texture circuits 1, 3, 5 to divide each of the rows or columns into a plurality of symbols, the symbols in each of the rows being displaced in the manner of the pulses in the FM train which provides the symbols for the column, the symbols in each row being displaced from the holes in the adjacent row in the manner of displacement of the pulses of the two FM pulse trains, such relation being readily apparent with reference to the symbol showing in the even and odd rows of FIGURE 2.

The frequency of the speed oscillator generator 144' is a multiple of the vertical scan frequency, and any deviation thereof from a multiple of the vertical scan frequency produces drift of the symbol in the columns toward the lower edge of the display to thereby provide a representation of forward motion of the aircraft relative to the ground. Variation of the rate of movement of the symbols across the display is used to provide a representation of a variation in the rate of the aircraft speed. A higher frequency multiple output by the speed oscillator circuit 144' increases the number of symbols in a row, and a lower frequency multiple decreases the number of symbols to thereby provide a representation of a range of different altitudes. Variation of the spacing between the pulses in the FM train with change in pitch produces a corresponding variation in the spacing between the symbols in the rows on the display.

The speed oscillator 144' basically comprises two crystal controlled oscillators including a master oscillator 217 and a speed crystal oscillator 200. The master oscillator 217 is operated at a constant frequency, and the speed oscillator 200 is held at a frequency which is a multiple of the vertical scanning frequency, and differs by a certain amount from that of the master oscillator 217.

The frequency of excitation of the speed crystal oscillator 200 is varied with changes in the speed of the aircraft, the changes being represented to the speed crystal oscillator 200 which are coupled thereto over conductor 201, and the variable frequency output which is now representative of the aircraft speed is extended over conductor 202 to the gate circuit 205 for coupling over conductor 206 to an FM oscillator 207, whose frequency is in turn modulated at a rate determined by the value of nonlinear sawtooth signal output of generator 209. Horizon generator 138 couples a horizon sync signal to the gate circuit 205 and the sawtooth generator 209 for synchronizing the operation of the circuit to the vertical repetition rate.

Pitch sensor 109 couples signals over conductor 210 to sawtooth generator 209 to control the amplitude of the sawtooth waveform output of sawtooth generator 209, and altitude sensor 113 couples a variable value D.C. voltage to the FM oscillator 207 to control the width and size of the sine-wave pulse output of the FM oscillator 207. As the variable sawtooth waveform signals are coupled to the FM oscillator 207, the degree of variation of frequency of the pulses in each wave train output is correspondingly varied to vary the distance between the successive impulses in each row. As the bias signal provided by the altitude sensor 113 changes the size of the sine wave pulses, the size of and distance between the symbols in a row is varied in a related manner.

The outputs of the FM oscillator 207 and the master oscillator 217 are coupled to a mixer amplifier 215 to produce beat waveforms at the difference frequency which is modulated in frequency by the sawtooth generator 209 and coupled over conductor 219 to frequency doubler 300.

The output of the master oscillator 217 is also coupled over conductor 218 to a delay circuit 216 and conductor 216' to a second mixer amplifier 215' for mixing with the output of the FM oscillator 207 which is coupled thereto over conductor 212' to provide a second beat waveform at the difference frequency, the second waveform being displaced in time relative to the first waveform for the purpose of effecting a corresponding vertical displacement of the symbols in the adjacent rows on the display.

*Frequency Doubler Circuits 300, 300'*

The output waveforms of the mixer amplifiers 215 and 215' are coupled to frequency doubler circuits 300, 300' respectively, which circuits are operative to increase the waveform frequency, and thereby the number of symbols which appear in each of the row on the display. The waveform trains are also coupled to the ground texture shift circuits 350 and 350' for reshaping and coupling to the ground texture circuits 1–6 for the purpose of effecting the desired randomized pattern on the display.

The manner in which the frequency doubler circuits 300 and 300' are operative is now set forth, reference being had to FIGURE 3 which sets forth the frequency doubler circuit 300 in detail. In that the frequency doubler 300' is of similar construction, the description of operation of the circuits will be limited to the circuit showing of FIGURE 3.

As there shown, frequency doubler circuit 300 basically comprises an input circuit 302, an inverter stage 310, amplifier stages 325, emitter-follower coupler stages 335, 340, and an output conductor 345 which extends the output signals of the frequency doubler 300 shown in the drawing adjacent conductor 345 to the clipper circuit 137 (FIGURE 1) for channel 1. The second frequency doubler 300' is similarly constructed, the output thereof being delayed in time relative to the output of frequency doubler 300, and being coupled over conductor 345' to clipper 137' for channel 2. As now shown, the frequency doubler circuits 300, 300' effect an increase in the number of pulses in each frequency modulated train which is coupled to the clipper circuits for channels 1 and 2, and thereby a corresponding increase in the number of symbols for each row.

Input circuit 302 for frequency doubler circuit 300 basically comprises an input conductor 219 which extends to the output of mixer amplifier 215, a potentiometer 303 connected between input conductor 219 and ground, and a coupling capacitor 304 connected to the junction point of a voltage divider including resistances 305, 306 which are connected between the B+ supply conductor 301 and ground. The junction point of the voltage divider is also connected to the input circuit for transistor 310' in the inverter stage 310.

Inverter stage 310 basically comprises an NPN transistor 310' having emitter, base and collector elements 311, 312, 313, respectively, the base circuit 312 being connected to the input circuit 302, emitter 311 being connected over resistor 314 to ground, and also over a coupling network including capacitor 316 and resistor 317 to the cathode of diode 321; and collector 313 being connected over adjustable resistor 315 to the B+ conductor 301, and also over the coupling network including capacitor 318 and resistor 319 to the cathode of diode 320. The anodes of diodes 320 and 321 are connected over resistor 322 to the B+ supply conductor 301 and also to the input circuit for amplifier stage 325. Diodes 320 and 321 may comprise diodes now commercially available as 1N457 diode units.

Amplifier stage 325 comprises a first transistor 325' having emitter, base and collector elements 326, 327, 328 respectively, base element 327 being connected to the output of the inverter stage 310, emitter element 326 being connected over resistor 329 and resistor 330 to ground and collector 328 being connected over load resistor 331 to the B+ supply conductor 301, and also to the input circuit for the coupler stage 335, 340. The emitter follower coupling stage 335 basically comprises an NPN transistor member 335', including emitter, base and collector elements 336, 337, 338, respectively, base element 337 being connected to the output of the first amplifier stage 325, collector element 338 being connected directly to the B+ conductor 301, and emitter element 336 being connected to the input for the emitter-follower coupler stage 340.

The emitter-follower coupling stage 340 basically comprises transistor member 340' including emitter, base and collector elements 341, 342, 343 respectively, the base 342 being connected to the output of amplifier stage 340, collector 343 being connected directly to the B+ conductor 301, and emitter 341 being connected over resistor 344 to ground, and also to the output conductor 345 for the purpose of coupling the output signals of the frequency doubler 300 to the clipper 137 for channel 1.

In operation, the mixer amplifier 215 couples the frequency modulated sine wave train over conductor 219 to the input circuit 302 for the frequency doubler 300. A related signal set is derived across adjustable resistor 303 in the input circuit and coupled over coupling capacitor 304 to the junction of voltage divider 305, 307 to the base element 312 of transistor 310' in the inverter stage 310 for amplification thereby. As shown by the waveform adjacent the collector and emitter output circuits in FIGURE 3, a first amplified signal set in the collector circuit is coupled over circuit 318, 319 to diode 320, and a second amplified signal in the emitter circuit (which is 180 degrees out of phase with the signal in the collector circuit) is coupled to the network including capacitor 316 and resistor 317 to the cathode of diode 321. The negative portion of the sine wave output of the collector and emitter circuits as coupled to the cathodes of diodes 320, 321 respectively effect enablement of the diodes and the coupling thereover of such portion of the sine waves to the input circuit for the amplifier stage 325. Since the negative portions of the sine waves in the collector and emitter circuit occur 180 degrees out of phase, the diodes 320, 321 will be alternatively conductive, and the output waveform of the diode pair will be as shown by the waveform pattern AD adjacent the output side of the inverter stage. It is apparent therefrom that each sine wave signal of the FM wave train which is coupled to the inverter stage 310 is reproduced as two half wave signals A, D, whereby the frequency of the signal train is doubled prior to coupling to the clipper circuit for the channel, and a correspondingly increased number of symbols are provided on the display.

The waveform signal output of the inverter stage 310 is coupled to the input circuit for the amplifier stage 325, which amplifies the signals in accordance with conventional amplifier techniques, and couples the same over the second amplifier stage 340 for further amplification prior to coupling to the emitter-coupler stage 340 for transmission over the conductor 345 to the clipper circuit 137 for channel 1, to effect the breaking up of the paths 2, 4, 6 into elliptical symbols which are spaced along the vertical axis at distances related to the spacing between the pulses in the train.

Frequency doubler circuit 300' is operative in a similar manner to provide a pulse train of increased frequency, the pulses of the train provided by frequency doubler 300' being out of phase timewise with the signal output of frequency doubler 300 by an amount which is predetermined by the setting of the delay circuit 216. The signal output of frequency doubler 300' is coupled to clipper 137' for channel 2 in the manner shown in the copending application Serial No. 728,019 to effect the breaking up of the paths 1,3,5 into elliptical symbols, which as shown in FIGURE 2, are vertically displaced relative to the symbols in the adjacent even-numbered rows. In the embodiment shown in the copending application Serial No. 728,019, the signal output of frequency doubler circuit 300' would be coupled to the clipper circuits over conductor 144' shown therein.

*Random Texture Circuit 350, 350'*

The function of the randomizing circuits 350, 350' is to develop a quasi-random aspect for the elements in the ground texture pattern to thereby assist in the minimization of possible mental fatigue which may result from prolonged observation of the symbols in their movement from the horizon in the direction of the lower marginal edge of the display. In the present arrangement, the ground texture circuits 350, 350' generate a shift waveform for the purpose of introducing an additional signal input to the ground texture circuits 2, 4, 6 and 1, 3, 5 in channels 1 and 2 respectively, which is of a value to effect lateral shift in the individual elements of the paths in a quasi-random manner. Basically the ground texture shift circuits 350 amplify the output train of the speed oscillator circuit 144' and reshape the sine waves to modified square waves, clip the resultant wave to further improve the shape of the waveform as square waves, and gate the resultant signals with a sawtooth waveform derived from the horizon sync to effect an increase in the amplitude of the shift or displacement signal as the symbol travels down the display.

In that the frequency train output of the frequency doubler circuits 300, 300' coupled to the clippers 137, 137' for the respective channels, are twice the frequency of the output pulses of the ground texture shift circuits 350, 350', every other element in a given column is displaced horizontally with respect to the elements above and below in the same row.

The novel ground texture shift circuit 350 for effecting the generation of the tracking pulses for effecting lateral shift of the alternate symbols in each row in the display is shown in detail in FIGURE 4, and as there illustrated basically comprises input circuit 355, amplifier shaper stage 360, coupling stage 370, an amplifier stage 380, a clipper stage 387, amplifier stage 395, emitter-follower coupler stage 400, a gating and mixing circuit 405, a second input circuit 410 including an amplifier stage 415 for coupling horizontal negative sawtooth waveforms to gate 405 for mixing with the amplified output trains of the coupling stage 400, and an output circuit 420 for coupling the combined signal output of the gate and mixing circuit 405 to the ground texture circuits 2, 4, 6 for channel 1. Ground texture shift circuit 350' generates a similar wave train output which is related to the frequency modulated wave train output of frequency doubler 300' and couples the generated train over conductor 422' to the ground texture circuits 1, 3, 5.

More specifically, the input circuit for ground texture circuit 350 basically comprises an input conductor 307 which is connected to the first output circuit 219 of the speed oscillator 144' which, it will be recalled, comprises a wave train of sine-wave, frequency modulated pulses. An adjustable potentiometer 356 is connected between conductor 219 and ground, and capacitor 357 is connected between the adjustable potentiometer arm and the junction point of a voltage divider including resistances 358, 359 which is connected between B+ supply conductor 301 and ground. The junction point of the voltage divider is connected to the input circuit for the amplifier stage 360.

Amplifier stage 360 basically comprises an NPN transistor 360' having emitter, base and collector elements 361, 362, 363 respectively, the emitter element 361 being connected over resistor 364 to ground, base element 362 being connected to the input circuit 355, and collector 363 being connected over resistor 365 to B+ conductor 301, and also over coupling capacitor 366 to the junction point of a voltage divider including resistances 367, 368 which are connected between B+ conductor 301 and ground. The junction point of the voltage divider is also connected to the input circuit for the emitter-follower coupler stage 370.

Emitter-follower coupler stage 370 basically comprises an NPN transistor 370' having emitter, base and collector elements 371, 372, 373 respectively, base element 372 being connected to the junction point of the voltage divider 367, 368, collector 373 being connected to B+ conductor 301, and emitter 371 being connected over resistor 374 to ground, and also over coupling capacitor 375 to the input circuit for amplifier stage 380.

Amplifier stage 380 basically comprises an NPN transistor 380 having emitter, base and collector elements 381, 382, 383 respectively, emitter 381 being connected to ground, base 382 being connected to the output of the emitter-follower coupler stage 380, and collector 383 being connected over resistor 384 to B+ conductors 301, and also over coupling capacitor 385 and resistor 386 to clipper stage 387 which basically comprises a first and a second diode 388, 388' connected in a parallel-opposed relation between resistor 386 and ground, and over capacitor 389 to the junction point of voltage resistor 390, 391, which is connected between B+ conductor 301 and ground. The junction point of voltage divider is coupled to the input circuit for amplifier stage 395.

Amplifier stage 395 basically comprises an NPN transistor member 395' having emitter, base and collector elements 396, 397, 398, respectively, emitter 396 being connected to ground, base 397 being connected to the output of clipper stage 387, and collector 398 being connected over resistor 399 to B+ conductor 301, and also to the input circuit for the emitter-follower coupler stage 400.

Emitter-follower coupler stage 400 basically comprises an NPN transistor having emitter, base and collector elements 401, 402, 403, base 402 being connected over resistor 404 to ground and also to the gate and mixing circuit 405.

Gating and mixing circuit 405 basically comprises a pair of diodes 406, 407, the anodes of which are connected over a load resistance 408 to the B+ conductor 301, and over a coupling capacitor 421 to the output circuit 400. The cathode of diode 406 is coupled to the output circuit of the emitter-follower stage 400, and the cathode of diode 407 is coupled to the output circuit of a sawtooth signal coupling stage 415.

Coupling stage 415 includes an NPN transistor member 415' connected in a conventional emitter-follower configuration and basically includes an emitter, base and collector element 416, 417, 418, respectively, the base 416 being connected over adjustable resistor 410 to the horizon generator circuit 138 which couples negative sawtooth signals thereto; collector 418 is connected directly to B+ conductor 301, and emitter 416 is connected over resistor 419 to ground, and also to the cathode of diode 407 in gating and mixing circuit 405.

In operation, as the frequency modulated sine wave output train of the speed oscillator 144' is coupled over conductor 219 to the input circuit 355 of the ground texture shift circuit 350, the adjustable resistor 356 derives a related signal for coupling over capacitor 357 to the junction point of voltage divider 358, 359 and the input circuit for amplifier stage 360. Voltage divider 358, 359 comprises resistances of a value which effect operation of the transistor 360' at saturation responsive to the coupling of each pulse of the train to the base 362, whereby the pulses which appear in the output circuit of the amplifier stage 360 will comprise modified square waves of the type shown adjacent the output circuit of amplifier stage 360.

The train of square wave impulses is coupled to the input circuit for the emitter-follower stage 370 which effects coupling of a like train of impulses to the further amplifier stage 380 for application to clipper stage 387, which is operative to clip the portion above and below the center of the wave forms as indicated by the dotted lines A and B to provide pulses having characteristics which are more closely related to a square wave shape.

Thus, diode 388 is conductive whenever the potential value of the pulse exceeds a predetermined positive value (+3/4 volts in one embodiment) and in such conduction the diode maintains the potential appearing at the junction point of the diodes constant at such value (+3/4 volts) until such time as the input pulse decreases in value to effect cutoff of the diode. In a similar manner diode 388' conducts as the potential of a pulse exceeds a predetermined negative value (−3/4 volts in one embodiment) whereby the value of the potential at the junction of the clipper stage 387 remains constant until such time as the negative potential decreases to terminate conduction of the diode 388'.

The amplifier stage 395 amplifies the square wave impulse output as shaped by the clipper stage 387 and couples the pulses to the emitter-follower couper stage 400 for coupling to diode 406 of the gate and mixing circuit 405.

A negative sawtooth wave is repeatedly coupled over input circuit 410 and coupling stage 415 to the cathode of the diode 407 at the rate of the vertical trace of the raster. As the leading edge of the negative sawtooth wave is coupled to the cathode of diode 407, the diode is biassed towards cutoff and the potential at the junction point E of mixing circuit 405 rises rapidly towards the potential of the B+ conductor 301. As the point E goes positive, the diode 406 is biassed towards conductivity. As the leading edge of a negative square wave pulse is now coupled to the cathode of diode 406 by the emitter follower coupler stage, diode 406 conducts and the junction point E of mixing circuit 405 goes negative towards a predetermined potential which is determined by the value of the negative sawtooth wave and remains at such value during the period of receipt of the negative pulse over coupler stage 400. Diode 406 conducts until such time as the trailing edge of the negative square wave pulse is coupled to the cathode of diode 406, and the diode is now biassed to cutoff, and the potential at junction E of mixing circuit 404 goes positive to effect enablement of the diode 407 which conducts to couple a segment of the negative-going sawtooth wave to the junction point A of the mixing circuit 405 which is related to the duration of the positive portion of the pulse coupled to diode 406 by the emitter coupler stage 400. As the succeeding negative going pulse is coupled to the cathode of the diode 406, the diode conducts to reduce the potential at the junction point E of the gating and mixing circuits 405 and thereby effect cutoff of diode 407 in the manner above described.

It is apparent therefore that the output wave train of the ground texture shift circuit will be of the shape set forth in FIGURE 4 adjacent output conductor 422. In the specific embodiment shown in the copending application Serial No. 728,019, the signal train would be coupled over conductor 220a of the ground texture circuit.

As shown in the illustration of FIGURE 2, the shift pulse wave-form output from the ground texture shift circuit 350 will result in the lateral shifting of alternate pulses which are generated by the ground texture circuit which result in the provision of the row of symbols in the even rows in the display. In the present embodiment even rows are generated by ground texture circuits 2, 4, 6 (FIG. 1). For illustrative purposes it may be assumed that the first broken triangle (or row of symbols) on the left hand side of the display shown in FIGURE 2 is generated by ground texture circuit 2 and is represented by the waveform shown along the left hand margin of the display. The projection of the crests of the sine wave waveform shown at the left of FIGURE 2 indicates that the first illustrated row in the display should have twice as many symbols as illustrated. Further inspection of the display will show that the symbols absent from the even row appear in the shift row immediately adjacent thereto, and it is apparent that every other element in an even or odd row is displaced horizontally with respect to the elements above and below it, the shift pulse illustrated on the left hand side of FIGURE 2 effecting the lateral adjustment of such symbols in even rows, such as 2, 4, 6 respectively, and the shift pulse illustrated on the right hand side of FIGURE 2 effecting lateral adjustment of such symbols in odd rows, such as 1, 3, 5, respectively. Moreover, in that the amplitude of the successive pulses in each shift pulse train increases with the length of the train, the lateral displacement of the symbols is increased as the elements move down the display towards the lower marginal edge thereof.

The foregoing disclosure sets forth a new and novel circuit arrangement for effecting the provision of a random appearance in a display circuit with a minimum of equipment which requires a minimum of space and weight.

While what is described is regarded to be a preferred embodiment of the invention, it will be apparent that variations, rearrangements, modifications and changes may be made therein without departing from the scope of the present invention as defined by the appended claims.

What is claimed is:

1. In a visual indicator system for displaying different items of information on a display unit concerning the relative movement of an object, generator circuit means including a first circuit means for providing a path outline on said display unit, and a second circuit means operative to generate a first train of signals, circuit means operatively controlled by said first signal train to provide a second signal train having a larger number of signals than said first train, means operatively controlled by said second train to separate said path into a number of symbols larger than the number of signals on said first train, and shift circuit means responsive to said first train of signals to control lateral displacement on the display unit of at least certain of the symbols provided by the signals in the second train.

2. In a visual indicator system for displaying different items of information on a display unit concerning the relative movement of an object having generator circuit means including a first circuit means for providing a path outline on the display area of the display unit, and a second circuit means operative to generate a first train of signals, the improvement comprising frequency multiplier means operative to provide a second signal train having twice the number of signals of said first train, means in said first circuit means operatively controlled by said second signal train to separate said path into a related number of symbols, shift circuit means operatively controlled by said first signal train to generate a shift pulse for each signal in said first train, and means in said first circuit means responsive to said shift signals to effect the lateral displacement of alternate ones of the symbols on the display unit which are provided by the signals in the second train.

3. In a visual indicator system for displaying different items of information in a display unit concerning the relative movement of an object, generator circuit means including a first circuit means for providing a plurality of path outlines on said display unit, and a second circuit means operative to generate a first train of signals, the improvement comprising frequency multiplier means responsive to said first signal train to provide a second signal train having a larger number of signals than said first train, means in said first circuit means controlled by said second signal train to separate each of said paths into a number of symbols related to the number of signals in said second signal train, shift circuit means responsive to said first signal train to generate a plurality of shift pulses, and means in said first circuit means responsive to said shift pulses to effect the lateral displacement of alternate symbols in each of said paths.

4. In a visual indicator system for displaying different items of information on a display unit concerning the relative movement of an object, generator circuit means including a first circuit means for providing a path outline on said display unit, and a second circuit means operative to generate a train of sine-wave signals, the improvement which comprises frequency multiplier means including an inverter stage connected to said second circuit means to provide an output signal for each half-wave signal in said train of sine-wave signals, and thereby a second signal train having an increased number of impulses, means in said first circuit means responsive to said second signal train to separate said path into a number of symbols related to the number of signals in said second train, shift circuit means responsive to said train of sine-wave signals to generate a plurality of shift pulses, and means in said first circuit means controlled by said shift pulses to effect the lateral displacement of at least certain of the symbols in said path.

5. In a visual indicator system for displaying different items of information on a display unit concerning the relative movement of an object, generator circuit means including a first circuit means for providing a path outline on the display unit, and a second circuit means operative to generate a first train of sine-wave signals, the improvement comprising frequency multiplier means providing a second signal train having an increased number of impulses, means in said first circuit means operative to separate said path into a number of symbols related to said increased number of impulses, shift circuit means responsive to said first train to generate a train of square-wave shift pulses at the frequency of said sine-wave pulses, and means in said first circuit means responsive to said shift pulses to effect the lateral displacement of the path symbols on the display which occur concurrently in time with said shift pulses.

6. In a visual indicator system for displaying different items of information on a display unit concerning the relative movement of an object, generator circuit means including a first circuit means for providing a path outline on the display unit, and a second circuit means operative to generate a first train of signals, each of which signals has a sine-wave waveform, the improvement which comprises frequency multiplier means responsive to said second train of signals to provide a number of signals larger than said first signal train, means in said first circuit means responsive to said second train of signals to separate said path into a number of symbols related to the number of signals in said second train, shift circuit means comprising signal shaper means for providing a square wave signal for each sine-wave signal in said first train which is of a shorter duration than said sine wave signal, and means in said first circuit means responsive to said square wave signals to alter the time of generation of corresponding portions of said paths.

7. In a visual indicator system for displaying different items of information on a display unit concerning the relative movement of an object having generator circuit means including a first circuit means for providing a path outline on the display unit, and a second circuit means for generating a first train of signals, each of which signals has a sine-wave waveform, the improvement which comprises frequency multiplier means connected to said second circuit means for providing a second train of signals having a larger number of signals than said first signal train, means for coupling said second train of signals to said first circuit means, means in said first circuit means operative to separate said path into a number of symbols larger than the number of signals in said first train, and shift circuit means connected to said second circuit means comprising signal shaper means for providing a train of square wave signals having the frequency of the sine wave signals in said first train, means for modifying the amplitude of successive signals in the train, and means for coupling the resultant train of modified square wave signals to said first circuit means, and means in said first circuit means operative responsive to said modified signals to alter the time of generation of corresponding portions of said path and thereby a degree of lateral adjustment of the symbols.

8. In a visual indicator system for displaying different items of information on a display unit concerning the relative movement of an object, generator circuit means including a plurality of channel circuits, each of which is comprised of at least one ground texture circuit means for providing a separate path outline on said display unit, a common waveform generating circuit means operative to generate a first plurality of signal trains, frequency multiplier means for providing a second signal train for each of said first plurality of signal trains, each of which has a larger number of signals than its corresponding first train, means in each channel operative to separate the path of each channel circuit into a number of symbols corresponding to the number of signals in said second signal train, and a plurality of shift circuit means, different ones of which are operatively controlled by a different one of the first plurality of signal trains, each of said shift circuit means including means operative to generate a plurality of shift pulses corresponding to the number of pulses in its controlling train, and means for coupling the shift pulses of each shift circuit means to the channel circuit which is controlled by the corresponding one of said first train of signals.

9. A visual indicator system as set forth in claim 8 in which said common waveform generating circuit means for providing different trains for said certain channels includes means operative to introduce a phase-displacement between the signals of said different trains to thereby provide a relative displacement of the symbols in the rows of the different channels.

References Cited in the file of this patent
UNITED STATES PATENTS
2,292,045   Burnett _____ Aug. 4, 1942